Feb. 2, 1965 E. L. BLACK 3,168,450
SALINE-TO-POTABLE WATER CONVERSION SYSTEM AND METHOD
Filed May 8, 1961 3 Sheets-Sheet 3

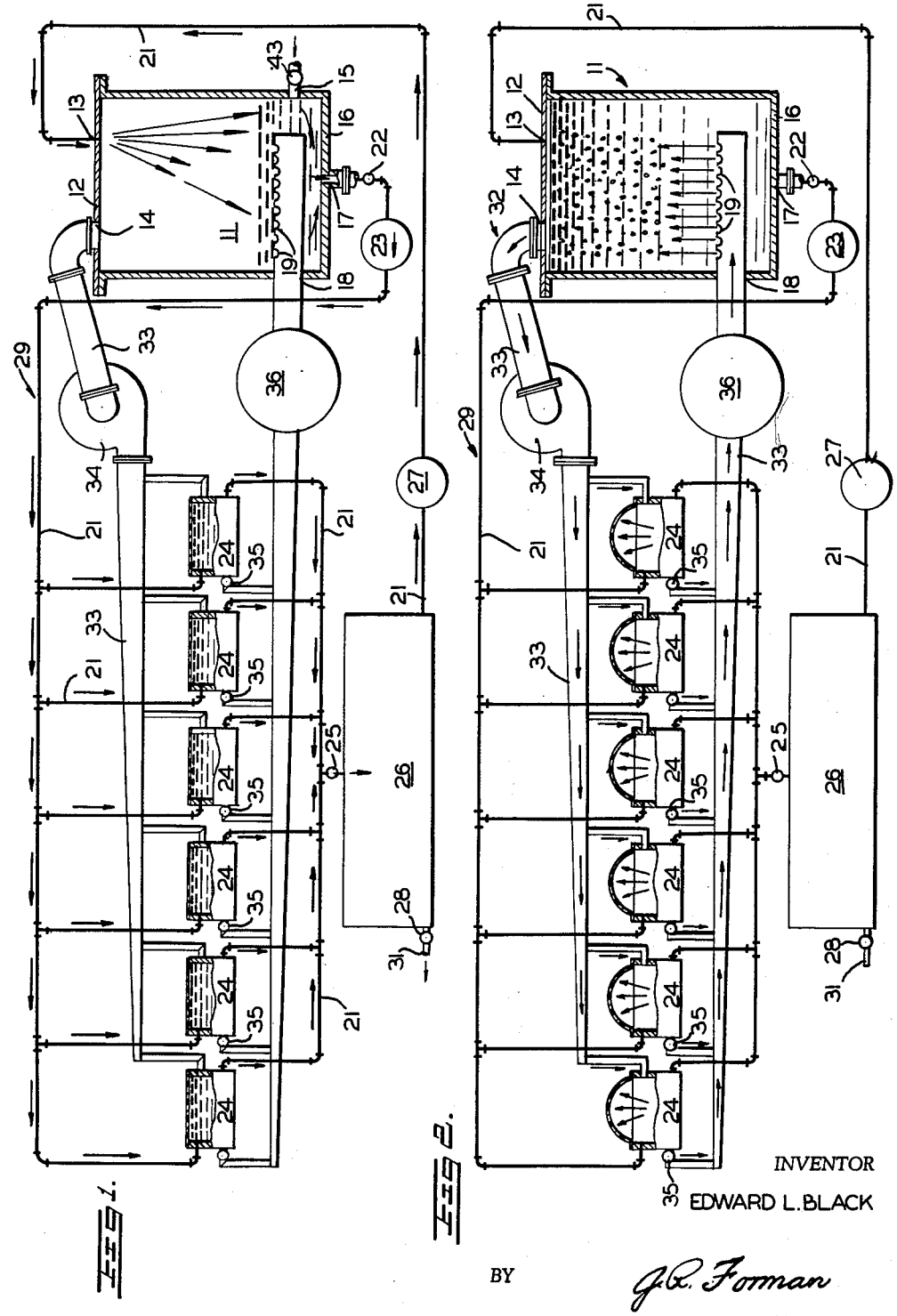

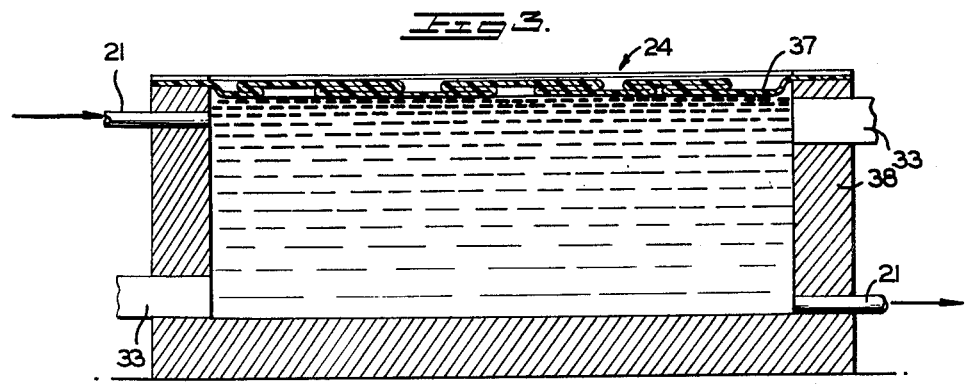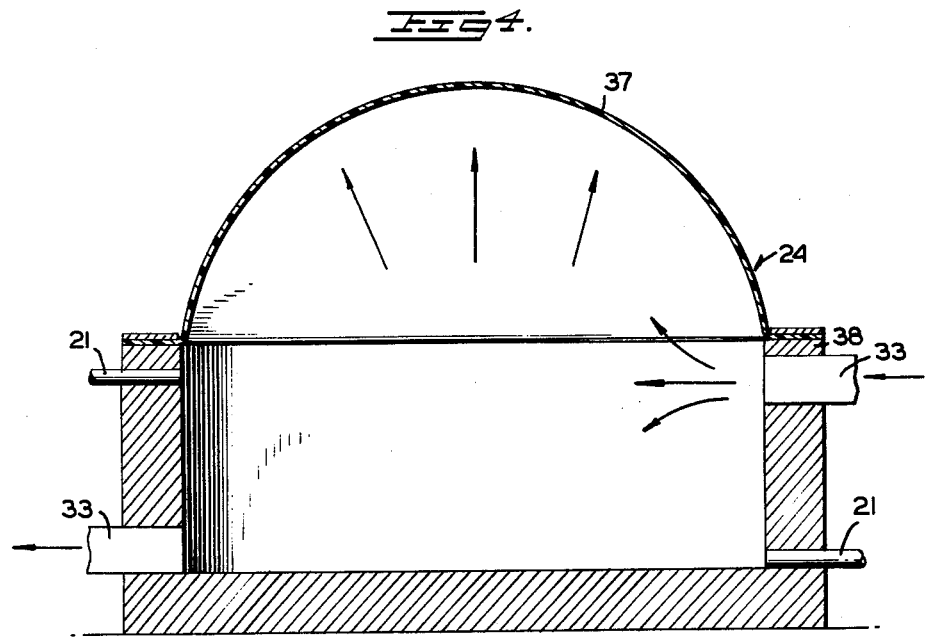

INVENTOR
EDWARD L. BLACK

BY J. R. Forman
ATTORNEY 3,168,450
SALINE-TO-POTABLE WATER CONVERSION
SYSTEM AND METHOD
Edward L. Black, 1111 Jefferson Ave., Falls Church, Va.
Filed May 8, 1961, Ser. No. 108,642
10 Claims. (Cl. 202—48)

This invention relates to a solar saline-to-potable water conversion system and more particularly to a system having closed liquid and gas circulatory systems operable in distinct phases to obtain an economical conversion process.

It is an object of the invention to provide a new and improved solar saline-to-potable water conversion system.

Another object is to provide a two-phase conversion system wherein heat energy of one phase is conserved for utilization in the following phase.

A further object is the provision of a solar saline-water conversion system including vessels for both heating a liquid and for condensing the liquid at separate phases without a change of structure of the vessels.

Still another object is to provide a solar saline water conversion system which is highly efficient in converting raw salt water into potable water wherein the heat requirement of the system is satisfied solely by the effective application of solar heat energy.

A complete understanding of the invention may be had from the following detailed description of a specific embodiment thereof when read in conjunction with the appended drawings, wherein:

FIG. 1 represents a schematic of a preferred embodiment of the invention with a liquid occupying a plurality of vessels indicative of one phase of the conversion process;

FIG. 2 is a schematic similar to that depicted in FIG. 1 but with a gas occupying the plurality of vessels indicative of a second phase of the conversion process;

FIG. 3 is an enlarged sectional view of the vessels shown in FIGS. 1 and 2 and illustrative of a liquid heating phase of the process;

FIG. 4 shows a sectional view of the vessels of FIGS. 1, 2 and 3 during a condensing phase of the conversion process;

Figure 5:
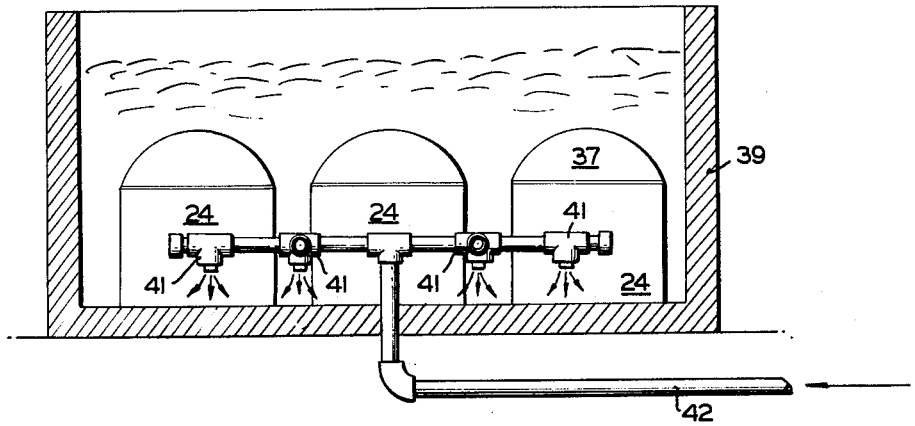
FIG. 5 represents an elevational view in section of a plurality of vessels within an enclosure with ductwork arranged between the vessels.

Referring to the drawings, wherein like reference numerals designate like or corresponding parts throughout the several views, there is shown in FIG. 1 a storage tank 11 having a closure 12 through which extends an inlet 13 for heated liquid and a gas outlet 14. An inlet 15 for raw liquid is passed through a wall of the tank 11 near its bottom 16, and an outlet 17 for raw liquid extends through the bottom 16. Also near the bottom 16 is an inlet 18 for gas, the inlet being passed through a wall of the tank 11 and protruding inside the tank 11 a distance sufficient to function as a gas nozzle with apertures 19 formed therein. Of course, any suitable nozzle may be employed which, when connected to the gas inlet 18, will discharge gas into the liquid to achieve the function described hereinafter.

The raw liquid, such as saline water to be converted to fresh water, flows within a pipe designated generally by numeral 21, FIG. 1, with the direction of flow designated by the arrows. The pipe 21 conducts raw liquid from the outlet 17 of the tank 11 through a suitable cut-off valve 22 and to the input side of a pump 23. From the output side of the pump 23 the raw liquid is forced onward through the pipe 21 into a plurality of vessels 24, and thence from the vessels 24 through a cut-off valve 25 to a collection vat 26. From the vat 26, the pipe 21 conveys the liquid to a pump 27, which forces the liquid through the tank inlet 13 to complete the closed liquid system 32. A drain 31, including a cut-off valve 28 is also connected to the vat 26.

In FIG. 2 there is shown a closed gas system 32 through which a gas such as air is conducted by a duct designated generally as numeral 33. The duct 33 is connected to the gas outlet 14 in the closure 12 of tank 11, thence to a pump 34, and then in branches to each of the vessels 24. The duct 33 then communicates each of the vessels 24 through cut-off valve 35 to a pump 36 having a check valve, not shown, into the tank 11 to force the gas through apertures 19 into the tank 11 and back through the gas outlet 14 to complete the closed gas system 32.

The solar vessel 24 is best shown in FIGS. 3 and 4 wherein there is depicted a transparent flexible cover 37 such as a membrane of plastic material or the like which may be of spectrally selective material, or a porous plastic film, for example. The cover 37 is gas-sealed about its periphery to a basin 38 which may have a darkened inner surface for maximum absorption of solar energy transmitted and contained within the basin 38 by the cover 37. The area of the cover 37 exceeds the cross-sectional area of the top of the basin 38, and, as shown in FIG. 3, is collapsible upon the surface of a liquid held within the basin 38. When the basin 38 is filled with gas under the pressure of the pump 34, FIG. 4, the cover 37 inflates to expose an undersurface upon which condensation of liquid vapor occurs.

Figure 6:
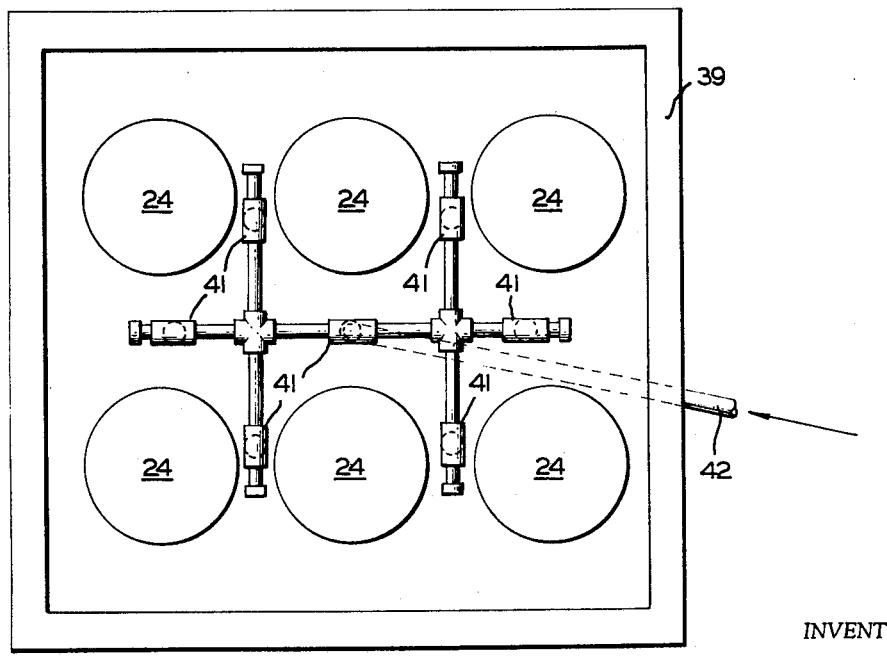
FIG. 6 is a top plan view of the layout of the plurality of vessels shown in FIG. 5.

FIGS. 5 and 6 show a layout of vessels 24 within an enclosure 39 which may be in the form of a wall or fence such that the ambient temperature of the atmosphere surrounding the solar vessels 24 may be lowered by the ejection of cool air through nozzles 41 into the enclosure 39. A pipeline 42 connects the nozzles 41 to an evaporator cooler, not shown, or any other suitably economical apparatus for cooling air. The liquid and gas circulatory systems 29 and 32, respectively, shown in FIGS. 1 and 2, are omitted from FIGS. 5 and 6 for clarity.

*Liquid heating phase*

A raw liquid such as saline water, for example, is fed into the conversion system via inlet 15 and cut-off valve 43, through the bottom 16 of the tank 11 and into pipe 21 through the outlet 17. Valve 25 is closed prior to the filling operation above described. The pump 23 forces the raw liquid passing the cut-off valve 22 from tank 11 to fill each of the vessels 24 to capacity whereupon the cover 37 floats on the surfaces of the liquid within the basins 38 of the vessels 24 as shown best in FIG. 3. While vessels 24 are filling with raw liquid, pump 36 may be operated to create a slight negative gas pressure in vessel 24, thus eliminating any air pockets under the cover 37. After filling the vessels 24, the cut-off valves 43 and 22 are closed. Heat energy of the sun is transmitted through the covers 37 of the basins 38 and is absorbed by the saline water, for example, and such becomes heated. The darkened inner surface of each basin also absorbs the heat of the sun rays to facilitate the heating of the contained liquid.

After the temperature of the liquid within basins 38 has risen to a desired level, or upon setting of the sun, cut-off valve 25 is opened to drain the heated liquid into the collection vat 26 from which it is pumped by pump 27 into the storage tank 11 via inlet 13. The tank 11 is thus filled with the solar heated liquid, and the solar vessels 24 and collection vat 26 are empty of liquid. Cut-off valve 25 is then closed in preparation for the next phase of operation.

Condensing phase

This phase is contemplated to function at such time as may be most propitious for dissipation of heat into the atmosphere, such as during the hours of darkness.

The valves 35 are opened within the gas circuit 32 and air, for example, under pressure of the pump 36 is forced through apertures 19 of the duct 33 within the tank 11 through the warm liquid now filling the tank. The air thus leaves tank 11, saturated and warmed, through outlet 14 and flows under the pressure of the pump 34 into the empty and cool vessels 24. The covers 37 of each of the basins 38 become inflated, and the moist warm air condenses on the undersurface of the inflated covers 37 to be collected in each of the basins 38. As the process of condensation proceeds, the condensate flows from the floor of vessels 24 by gravity into the emptied vat 26, where it is removed as a product of the system for example, potable water. On the other hand, if preferred, after the condensation has been completed the cut-off valve 25 is opened, the condensate is collected in vat 26, and then, by opening the drain 31, the product is removed from the system. During the condensing phase for improvement of efficiency, cool air may be introduced through the pipeline 42 into the air surrounding the inflated covers 37, FIGS. 5 and 6, and within the enclosure 39. A cool layer of air, lower than the normal ambient air temperature, thus envelops the vessels 24 for causing the warm moist air within the vessels to condense more readily on the undersurface of the covers 37.

It is obvious that the above-described embodiment of the invention is merely illustrative and that numerous modifications may be made therein within the spirit and scope of the invention. No representation is made herein as to relative capacities of vessels in aggregate and of the storage tank 11.

Having thus described my invention, what I claim is:

1. A saline-to-potable water conversion method comprising the steps of heating saline water in a vessel having an inflatable cover, transferring the heated saline water to a tank, forcing a gas through the heated saline water for warming and saturing the gas, conveying the warmed and saturated gas into the vessel under pressure sufficient to inflate the cover, the cover being at a temperature lower than that of the warmed gas such that the warmed and saturated gas condenses on the surface of the inflated cover, and collecting the condensate.

2. A saline-to-potable water conversion method comprising the steps of heating by solar energy saline water in a vessel having an inflatable cover transparent to the solar heat energy, floating the cover on the surface of the saline water for obtaining maximum heating of the water from the solar energy, transferring the heated saline water to a tank, forcing air through the heated saline water to saturate and warm the air, pumping the saturated warm air into the vessel under sufficient pressure to inflate the cover and expose a condensing surface of the cover, the saturated air being at a temperature higher than the ambient temperature surrounding the vessel cover in its inflated condition, and collecting the condensed water from the condensing surface of the vessel cover.

3. A saline-to-potable water conversion method comprising the steps of heating by solar energy saline water in a vessel having an inflatable cover transparent to the solar heat energy, floating the cover on the surface of the saline water for obtaining the maximum heating of the water from the solar energy, transferring the heated saline water to a tank, forcing a gas through the heated saline water to saturate and warm the gas, pumping the saturated warm gas into the vessel under sufficient pressure to inflate the cover and expose a condensing surface of the cover, lowering the ambient temperature surrounding the vessel to a temperature lower than that of the saturated gas within the vessel, and collecting the inflated condensate from the condensing surface of the vessel cover.

4. A condensing method for treatment of liquids comprising the steps of heating a liquid in a vessel having an inflatable cover, transferring the heated liquid to a tank, forcing a gas through the heated liquid for warming and adding moisture to the gas whereby a moist vapor is created, conveying the resultant moist vapor into the vessel under pressure sufficient to inflate the cover, cooling the ambient temperature surrounding the vessel to a temperature below that of the moist vapor causing condensation of the vapor on a surface of the inflated cover, and collecting the condensate.

5. An apparatus for treating liquids which comprises a vessel including a rigid basin and an inflatable film sealed to the basin to form a cover for the vessel; a tank; conduit means connected to the tank and to the vessel for conveyance of a liquid therebetween in a first closed circulatory system; pump means connected to the conduit means for forcing a liquid through the conduit means; duct means connected to the tank and to the vessel for conduction of a gas therebetween in a second closed circulatory system; a nozzle connected to the duct means and positioned within the lower portion of the tank and submerged by a liquid to be contained in the tank; valve means in the conduit means for containing the liquid selectively in the vessel and in the tank at distinct time periods; the cover of the vessel being inflated by the gas after passage through the tank to provide a condensing surface.

6. A condensing apparatus which comprises a closed gas circulatory system including a vessel with a cover inflatable when gas is forced into the vessel, a tank connected in the gas circulatory system such that gas in the gas circulatory system travels through a liquid when contained in the tank, and pump means for forcing gas through the gas circulatory system; a closed liquid circulatory system including the vessel and the tank, and pump means for forcing liquid through the liquid circulatory system; and means operable for switching the tank and the vessel selectively from one closed circulatory system to the other.

7. A condensing apparatus which comprises a closed gas circulatory system including a vessel with an inflatable cover capable of penetration by heat rays of the sun and a storage tank, the tank being placed in the path of gas flowing through the system such that the gas bubbles through a warm liquid when contained in the tank and becomes warmed and saturated, and means for pumping gas through the system and the liquid in the tank to inflate the cover of the vessel and form a condensing surface thereon; a closed liquid circulatory system including the vessel and the tank, the inflatable cover being of an area to float on the surface of a liquid contained in the vessel when the cover is in a collapsed condition, and means for pumping liquid heated by the sun when contained in the vessel under the collapsed cover into the tank; and means operable to conduct the liquid after solar heating in the vessel to the tank after which time the gas is circulated through the liquid in the tank and becomes warmed and saturated before passing into the vessel.

8. A solar condensing system which comprises a tank, a vessel with an inflatable cover, means for conducting a liquid between the vessel and the tank, means for conducting a gas through the vessel to inflate its cover to form a condensing surface, the gas first being conducted through the tank for warming and moistening the gas by forcing the gas through a warm liquid contained in the tank with the gas being bubbled through the liquid, means for conducting selectively the gas and the liquid between the vessel and the tank, and means encompassing the vessel for lowering the ambient temperature of the atmosphere surrounding the vessel.

9. In a condensing apparatus, the combination of a vessel having a transparent inflatable cover whereby liquid contained in the vessel is heated by solar energy, a tank for periodically containing the liquid heated within the vessel, and emptied therefrom into the tank, conduit means connecting the vessel and the tank for circulation of a liquid therebetween, duct means connecting the vessel and the tank for circulation of a gas therebetween when heated liquid is stored in the tank, valve means for interrupting the connection of the duct means between the tank and the vessel, means for interrupting the connection of the conduit means between the tank and the vessel, and means for introducing a coolant in the area surrounding the vessel to lower the ambient temperature, the gas when circulated between the tank and the vessel being under sufficient pressure to inflate the cover to form a condensing surface, and the heated liquid within the tank being in the path of circulation of the gas travels through the liquid and whereby the gas becomes warmed and saturated for condensing on the inflated cover.

10. A method for condensing a liquid comprising the steps of heating the liquid by solar energy in a vessel, emptying the vessel of its heated liquid, containing the heated liquid within a tank, forcing a gas through the warm liquid contained by the tank to moisten and warm the gas, enlarging the volume of the vessel to form an enlarged condensing surface by the pressure of the moistened and warmed gas whereby the moisture of the gas is condensed on the enlarged condensing surface, the surface temperature being lower than that of the warmed gas, and collecting the liquid condensed within the vessel.

References Cited by the Examiner
UNITED STATES PATENTS

| | | |
|---|---|---|
| 217,703 | 7/79 | Monsanto. |
| 983,424 | 2/11 | Brosius. |
| 1,493,757 | 5/24 | La Bour _____ 202—49 |
| 2,305,408 | 12/42 | Clemens. |
| 2,368,665 | 2/45 | Kohman _____ 202—49 X |
| 2,455,835 | 12/48 | Ushakoff _____ 202—49 X |
| 2,803,591 | 8/57 | Coanda et al. |
| 2,902,414 | 9/59 | Smerzlen. |
| 2,975,107 | 3/61 | Friedman. |
| 3,015,613 | 1/62 | Edmondson. |

NORMAN YUDKOFF, *Primary Examiner.*

ALPHONSO SULLIVAN, *Examiner.*